(12) United States Patent
Langner et al.

(10) Patent No.: US 12,131,615 B2
(45) Date of Patent: Oct. 29, 2024

(54) SECURITY SYSTEM AND METHODS

(71) Applicant: Jaco Langner, Randburg (ZA)

(72) Inventors: Jaco Langner, Randburg (ZA);
Conrad Baartman, Bryanston (ZA);
Jeandre Du Plessis, Fourways (ZA);
Andrew Mark Smith, Bryanston (ZA)

( * ) Notice: Subject to any disclaimer, the term of this patent is extended or adjusted under 35 U.S.C. 154(b) by 69 days.

(21) Appl. No.: 17/774,957

(22) PCT Filed: Nov. 5, 2020

(86) PCT No.: PCT/IB2020/060421
§ 371 (c)(1),
(2) Date: May 6, 2022

(87) PCT Pub. No.: WO2021/090232
PCT Pub. Date: May 14, 2021

(65) Prior Publication Data
US 2022/0383718 A1    Dec. 1, 2022

(30) Foreign Application Priority Data

Nov. 6, 2019    (ZA) ................................. 2019/05203

(51) Int. Cl.
| | |
|---|---|
| G08B 15/02 | (2006.01) |
| F41H 9/04 | (2006.01) |
| G06T 7/20 | (2017.01) |
| G06T 7/70 | (2017.01) |
| G06V 20/52 | (2022.01) |
| G06V 40/16 | (2022.01) |
| H04R 1/02 | (2006.01) |
| H04R 3/00 | (2006.01) |

(52) U.S. Cl.
CPC ............. *G08B 15/02* (2013.01); *F41H 9/04* (2013.01); *G06T 7/20* (2013.01); *G06T 7/70* (2017.01); *G06V 20/52* (2022.01); *G06V 40/172* (2022.01); *H04R 1/028* (2013.01); *H04R 3/00* (2013.01); *G06T 2207/30201* (2013.01); *G06T 2207/30232* (2013.01)

(58) Field of Classification Search
CPC .. G08B 15/02; F41H 9/04; F41H 9/10; G06T 7/20; G06T 7/70; G06T 2207/30201; G06T 2207/30232; G06V 20/52; G06V 40/172; H04R 1/028; H04R 3/00
USPC ........................................................ 340/541
See application file for complete search history.

(56) References Cited

U.S. PATENT DOCUMENTS

| | | | | |
|---|---|---|---|---|
| 7,158,167 B1* | 1/2007 | Yerazunis | ............... | H04N 5/907 386/E5.067 |
| 8,616,882 B2* | 12/2013 | Chedid | ................. | F41G 3/2655 434/11 |
| 9,472,067 B1* | 10/2016 | Jentoft | ................... | G08B 15/02 |
| 2006/0137251 A1* | 6/2006 | Imai | ...................... | H02H 7/0851 49/360 |
| 2012/0092163 A1* | 4/2012 | Hart | ....................... | G08B 15/02 340/541 |
| 2015/0124087 A1* | 5/2015 | Jones, Jr. | ............... | G08B 15/02 348/143 |
| 2015/0204109 A1* | 7/2015 | Ergenbright | ........... | G05B 13/00 340/541 |
| 2015/0347902 A1* | 12/2015 | Butler, Jr. | ............. | G08B 31/00 706/46 |
| 2018/0025636 A1* | 1/2018 | Boykin | ............ | G08G 1/096725 701/1 |
| 2019/0295397 A1* | 9/2019 | Eckert | ...................... | G08B 5/36 |
| 2023/0042549 A1* | 2/2023 | Tsutsui | .................. | E05F 15/659 |

FOREIGN PATENT DOCUMENTS

| | | | | |
|---|---|---|---|---|
| CN | 108615321 A | | 10/2018 | |
| EP | 2905761 A1 | | 8/2015 | |
| WO | WO-2014134217 A1 * | | 9/2014 | ......... G08B 13/1672 |

OTHER PUBLICATIONS

International Search Report and Written Opinion from International Application No. PCT/IB2020/060421 mailed Feb. 3, 2021.

* cited by examiner

*Primary Examiner* — Omar Casillashernandez
(74) *Attorney, Agent, or Firm* — Dorsey & Whitney LLP

(57) ABSTRACT

Disclosed is a security system, and method of operating it, with the system including a controller with an associated processor, associated storage means, a power supply, and data communication means; with the system configured to receive and analyze data input from associated event sensors, according to predeterminable rules and parameters stored on the storage means for the processor to determine the presence of an alarm event and a predetermined set of responses and predetermined set of security outcomes to select a response to the alarm event with the aim of achieving a predetermined security outcome to protect the asset, and generating an output signal to at least one countermeasure device to activate the countermeasure device to deliver the selected response.

23 Claims, No Drawings

SECURITY SYSTEM AND METHODS

FIELD OF THE INVENTION

This invention relates to a security system and a method of operating a security system used for the protection of assets and to assist in providing personal security.

BACKGROUND TO THE INVENTION

The need for security is commonplace and widespread, and security systems that address this range from relatively basic home installations to sophisticated business and corporate installations.

A common feature of security systems is the incorporation of a form of sensory device or more generally an event sensor, including for example any one or more of passive infrared motion sensors, magnetic contact sensors, electric fence voltage monitors, vibration sensors, sound sensors, smoke detectors, and cameras with infrared lighting capability coupled with, for example, motions sensors.

A conventional security system usually includes a so-called control panel which receives electrical signals from these event sensors. A fault or alarm is detected by the absence of an "all-clear" signal or the presence of a "fault" or "alarm" signal. This fault or alarm event signal triggers the control panel to transmit an electrical control signal to one or more output devices. These output devices include any one or more of sirens, strobe lights, and signal transmitters. Such signal transmitters are typically configured to send an appropriate signal, i.e. fault or alarm, to a predefined recipient. The recipient could be a person responsible for the monitored property such as a homeowner or a facility manager or caretaker in the case of a business, or it could be a third-party alarm monitoring company.

Most typically, an alarm monitoring company will have a secure remotely located control room where such event signals are received. The control room typically has at its disposal a response team, which may be armed, that can be dispatched to investigate the cause of a fault or alarm signal. Often, such response teams are not dispatched until a telephone call has been placed to a listed responsible person who needs to confirm, by means of a password, that all is clear or that all is not clear. Although there is no real technical reason to do so (i.e. to only dispatch a response team in the absence of an authorized "all-clear, just a false alarm" confirmation from the owner or responsible person), many alarm monitoring companies still do this to avoid overburdening their response teams with false alarms. The negative effect of this is that the response of such a response team to a genuine emergency may be delayed.

In some instances, control rooms are also given remote video access to view footage from security cameras, and in rare instances also the ability to trigger on-site deterrent devices such as a non-lethal gas to fill a protected area. The purpose of the release of such gas is to limit the ability of intruders to see and to induce panic, both of which may be expected to force intruders to terminate the intrusion of a monitored property. Such remote intervention applications are most typically reserved for business type installations due to the obvious privacy concerns of having video footage from a home installation being monitored off-site and the risk of having an unintended release of such gas, albeit not harmful, in the presence of legitimate occupants of a monitored property.

A problem with all of these conventional security systems is the required human intervention and the typical time delay this causes. When an alarm signal is sent to a third-party alarm monitoring company the speed with which that alarm signal is treated depends directly on the capacity of that company's control room and the number of response teams available to it. If the third-party alarm monitoring party happens to have already received a multitude of alarm signals in short time from each other, further alarm signals will be queued for attention whilst the older alarm signals are dealt with. This could be expected to cause a time delay.

It is known in the security industry that criminal gangs exploit this known response delay by targeting a specific area or neighbourhood. A gang could determine, by simple observation and sometimes from inside information, which alarm monitoring company operate in a specific area and what its capacity is to deal with simultaneous, or very close to simultaneous, alarm signals from more than one monitored property in an area. The gang will then pick a specific property or series of properties to target at a specific time. Before the gang moves against its intended target it monitors the location of response teams in the specific area. At the appropriate time, usually when the response team is located distant from its intended target, the gang trigger false alarms at numerous other properties in the same area, all of which are monitored by the alarm monitoring company. This can be done by touching electric fence wires to each other or cutting an electric fence, throwing rocks through windows (with fitted detectors), stepping in front of motion detectors, and so forth. All of these event sensors will then report alarm signals through their respective control panels to the alarm monitoring company, which will duly deal with these alarm signals in the order they are received and start dispatching response teams to investigate each of them.

This takes time and keeps the response teams occupied. In the meantime, the gang targets the property it is really interested in and although the sensory devices on that property will also send alarm signals to the control room, the queue of alarm signals ahead of it will cause a delay in the response teams getting to the targeted property.

The targeted property may often be selected on the opposite side of the monitored area where the 'false' alarms are triggered, which reduces the likelihood that the response team will come across the gang whilst it makes its getaway. These gangs operate very fast and need only a few minutes to burgle or rob assets of significant value from a property. By making use of this technique, a gang is able to create a window of opportunity that is large enough—even if only a few minutes—for it to enter, burgle or rob, and flee a targeted property without intervention by an alarm monitoring company. Even if the alarm monitoring company realizes that this distraction technique is being used, its control room won't know which monitored property from which it receives an alarm signal is the real target and it would still have to deal with alarms as they are triggered.

In a worst case, a homeowner and his family may be at home when this happens, and they would be helplessly waiting for a response team to arrive. Such a family must suffer alone through such an event with no effective help at hand, at least not in time. In many instances people are injured or killed in the process.

The use of sensory devices such as cameras are also, as mentioned above, limited due to privacy considerations, especially with home installations. Even in businesses, the use of cameras must be limited to public areas such as passages and foyers. Many businesses handle confidential information and cannot have a monitoring device such as a camera with sound recording capabilities present in, for example, a meeting room when the media recorded by that camera will be monitored by a person outside the meeting room, especially a third-party entity located off-site. A law firm is an example of such a business. Cameras are therefore typically not installed in such areas which leaves those areas unprotected, and more vulnerable to intrusion compared to areas that do have cameras installed therein.

In instances where gas deployment is used, it is only done if an intrusion is detected and remotely verified by a human operator as being such from a live camera feed. The gas that is deployed may include fog to disorientate intruders and/or pepper spray to irritate intruders enough to leave the monitored property. This requirement for human intervention again introduces privacy and time delay factors which limit the deployment of such security systems. Even in instances where privacy concerns are overcome or not present, the cost of providing such a service is high if the response time must be guaranteed. This is due to maintaining a high enough staff availability to monitor alarm signals. Even then, response times may still be delayed if a high number of alarm signals are received around the same time. It should be noted in respect of this vulnerability that the abovementioned decoy technique (i.e. triggering a multitude of false alarms to keep response teams busy) may also be used against alarm monitoring companies that have access to gas deployment technology.

Another problem with such remote monitoring systems is that they rely on transmission of significant amounts of data. Such systems only work when there is an open communication channel between the monitored property and the control room. This requires dedicated communication channels which may also fail and are expensive to install and maintain. In some instances, criminal gangs will deliberately sabotage communication channels, such a telephone and data communication lines to avoid or at least delay intervention.

It is also known in the security industry that criminals have access to signal jammers which disrupt radio signals from wireless communication systems, including GSM jammers that block mobile telephony systems. This allows a gang to effectively cut a targeted area off from outside help for the duration of its intrusion.

Such GSM jammers emit powerful signals that block alarm signals sent by alarm systems to alarm monitoring companies. Such a device could be the size of a shoe box and can block GSM signals within a radius of one square kilometre. By way of example, such a device can block all phone, text and data traffic in an entire housing estate.

Current security systems are not capable of fully, reliably and quickly deterring the efforts of criminal gangs, whose efforts continuously evolve. There is a need for a security system that at least partly overcomes these problems.

OBJECTIVE OF THE INVENTION

It is an objective of the invention to provide a security system and a method of operating a security system which at least partly overcome the abovementioned problems.

SUMMARY OF THE INVENTION

In accordance with this invention there is provided a security system which includes a controller with an associated processor, associated storage means, a power supply, and data communication means;
with the system configured to include at least one associated event sensor and at least one associated countermeasure device, both operatively associated with an asset monitored by the security system and in data communication with the controller through the data communication means;
with the processor configured:
to receive data input from an associated event sensor, and
to analyze data input from the event sensor according to predeterminable rules and parameters stored on the storage means for the processor to determine the presence of an alarm event;
for the processor to determine from the alarm event and from a predetermined set of responses and predetermined set of security outcomes stored on the storage means in association with the alarm event a selected response to the alarm event with the aim of achieving a predetermined security outcome to protect the asset, and
for the processor to generate an output signal to:
at least one countermeasure device with the output signal configured to activate the countermeasure device to deliver the selected response, or
at least one monitoring station with the output signal configured to alert the monitoring station to activate the countermeasure device to deliver the selected response.

There is further provided for the event sensors to include any one or more of passive infrared motion sensors, magnetic contact sensors, electric fence voltage monitors, vibration sensors, sound sensors, smoke detectors, radar detection, laser pulse detection and cameras, preferably with integrated infrared lighting or thermal imaging capability, and any other suitable event sensor configured to detect the occurrence of a specific event relevant to monitoring of the asset by the security system.

There is further provided for the system to be configured for the processor to generate an output signal to activate a specific countermeasure device at a specific time to deliver the selected response based on input received from specific event sensors operatively associated with the specific countermeasure device, with the specific time being determined by the processor to optimize the effectiveness of activation of the countermeasure device in achieving the predetermined security outcome to protect the asset.

There is further provided for the system to be configured for the processor to monitor data input from the event sensors operatively associated with the specific countermeasure device to determine whether the activation of the specific countermeasure device has achieved the predetermined security outcome within a predeterminable time, and if the predetermined security outcome has not been achieved within such time for the processor to generate an output signal to activate the same countermeasure device again or to activate another countermeasure device to deliver the selected response, alternatively for the processor to determine a modified response and for the processor to generate an output signal to activate the same countermeasure device again or to activate another countermeasure device to deliver the modified response, to achieve the predetermined security outcome.

There is further provided for the system to include, stored on its storage means, a database with data relating to authorized people, being people that are associated with the asset, with the database including without limitation imaging data related to the authorized people, and schedule data indicating whether there is any time when an authorized person is not allowed on a property associated with the asset;
with the system configured for the processor:

to monitor by means of event sensors the presence and location of people on or proximate the property;

for the processor to determine as an alarm event any one of the following:

the presence on the property of an unauthorized person, being a person that is not associated with the asset;

the presence of an unauthorized person loitering proximate the property, with loitering determined by a person remaining in a predeterminable geographical area longer than a predeterminable period;

the presence of an authorized person on the property at a time when the person is not allowed on the property; and the presence of an authorized person in a location on the property where the person is not allowed;

for the processor to determine a selected response to the alarm event; and for the processor to generate an output signal to activate a specific countermeasure device directed at the person whose presence or location on or proximate the property causes the determination of the alarm event.

There is further provided for the system to be configured for a selected response to an alarm event caused by the presence of an authorized person in a location on the property where the person is not allowed to include at first a warning signal, with the warning signal comprising an audio message directing the person to move out of the location where the person is not allowed.

There is further provided for the controller to be configured to differentiate between types of alarm events, at least between:

a fire alarm determined from data input received by the processor from a smoke detector, including from a camera configured to detect smoke, and a security alarm determined from data input received by the processor from any one or more of one of the event sensors excluding the smoke detector.

There is further provided for the system to be configured for the processor to generate an output signal that activates any one or more of a loudspeaker or the transmission of a data carrying signal to a mobile communication device to:

issue an evacuation warning signal to authorized people in the event that it determines an alarm event to be a fire alarm, and to issue a protection warning signal if it determines an alarm event to be a security alarm.

There is further provided for the predetermined security outcome associated with an evacuation warning signal to include the evacuation from the property of authorized people who are present on the property, and for the system to be configured for the processor to monitor the movement and location of at least authorized people who are present on the property at the time of the alarm event by means of data input from event sensors to confirm their evacuation from the property, and for the system to be configured for the processor to generate an additional output signal to activate specific loudspeakers or transmit a data carrying signal to a specific mobile communication device to issue evacuation warning signals to authorized people who need to evacuate the property.

There is further provided for the predetermined security outcome associated with a protection warning signal is the movement of authorized people away from a source of the alarm event, preferably to at least one predeterminable safe location on the property, and for the system to be configured for the processor to monitor the movement and location of the authorized people who are present on the property at the time of the alarm event, and to monitor the location and movement of the source of the alarm event by means of data input from event sensors to confirm the movement of people associated with the property away from the source of the alarm event and preferably to the safe location, and for the system to be configured for the processor to generate an additional output signal to activate specific loudspeakers or transmit a data carrying signal to a specific mobile communication device to issue an additional protection warning signal if any one or more people do not move away from the source of the alarm event or to the safe location at all or fast enough to avoid the source of the alarm event.

There is further provided for the loudspeaker to be associated with a camera, and for the system to be configured for the processor to generate an output signal that is transmitted to a loudspeaker within a predeterminable distance from the location of a specific authorized person, and for the output signal to be configured to activate the loudspeaker to issue and audio message with the person's name and with movement instructions for a route to follow to evacuate the property, move away from source of the alarm event or reach the sale location, as the case may be.

There is still further provided for the system to be configured for the processor to monitor the distance between an intruder being the source of an alarm event and authorized people on the property, and for the processor to generate an output signal that activates one or more specific countermeasure devices to deter the intruder from moving closer to the authorized people, and the specific countermeasure devices include, without limitation, an automated pepper spraying device and a restraining device, each being remotely controllable by means of output signals generated by the processor.

There is further provided for the asset to comprise any one or more of a person, a place or an object.

According to a further aspect of the invention there is provided a method of operating a security system as defined above, including the steps of the processor:

receiving data input from an associated event sensor, analyzing data input from the event sensor according to predeterminable rules and parameters stored on the storage means for the processor to determine the presence of an alarm event, determining from the alarm event and from a predetermined set of responses and predetermined set of security outcomes stored on the storage means in association with the alarm event a selected response to the alarm event with the aim of achieving a predetermined security outcome to protect the asset, and generating an output signal to:

at least one countermeasure device with the output signal configured to activate the countermeasure device to deliver the selected response, or at least one monitoring station with the output signal configured to alert the monitoring station to activate the countermeasure device to deliver the selected response.

There is further provided for the method to include the step of the processor:

generating an output signal to activate a specific countermeasure device at a specific time to deliver the selected response based on input received from specific event sensors operatively associated with the specific countermeasure device, with the specific time being determined by the processor to optimize the effectiveness of activation of the countermeasure device in achieving the predetermined security outcome to protect the asset.

There is also provided for the method to include the steps of the processor:

monitoring data input from the event sensors operatively associated with the specific countermeasure device to determine whether the activation of the specific countermeasure device has achieved the predetermined security outcome within a predeterminable time, and if the predetermined security outcome has not been achieved within such time the step of the processor:

generating an output signal to activate the same countermeasure device again or to activate another countermeasure device to deliver the selected response, alternatively determining a modified response and generating an output signal to activate the same countermeasure device again or to activate another countermeasure device to deliver the modified response, to achieve the predetermined security outcome.

There is also provided for the method to include the steps of the processor:

monitoring by means of event sensors the presence and location of people on or proximate the property;

determining as an alarm event any one of the following:

the presence on the property of an unauthorized person, being a person that is not associated with the asset;

the presence of an unauthorized person loitering proximate the property, with loitering determined by a person remaining in a predeterminable geographical area longer than a predeterminable period;

the presence of an authorized person on the property at a time when the person is not allowed on the property; and the presence of an authorized person in a location on the property where the person is not allowed;

determining a selected response to the alarm event; and generating an output signal to activate a specific countermeasure device directed at the person whose presence or location on or proximate the property causes the determination of the alarm event.

There is also provided for the method to include the steps of the processor differentiating between types of alarm events, including at least:

a fire alarm determined from data input received by the processor from a smoke detector, including from a camera configured to detect smoke, and a security alarm determined from data input received by the processor from any one or more of one of the event sensors excluding the smoke detector.

There is also provided for the method to include the steps of the processor generating an output signal that activates any one or more of a loudspeaker or the transmission of a data carrying signal to a mobile communication device or computer:

to issue an evacuation warning signal to authorized people in the event that it determines an alarm event to be a fire alarm, and to issue a protection warning signal if it determines an alarm event to be a security alarm.

There is further provided for the method to include the steps of the processor:

monitoring the movement and location of at least authorized people who are present on the property at the time of the alarm event by means of data input from event sensors to confirm their evacuation from the property, and generating an additional output signal to activate specific loudspeakers or transmit a data carrying signal to a specific mobile communication device to issue evacuation warning signals to authorized people who need to evacuate the property.

There is also provided for the method to include the step of the processor:

monitoring the movement and location of the authorized people who are present on the property at the time of the alarm event, monitoring the location and movement of the source of the alarm event by means of data input from event sensors to confirm the movement of people associated with the property away from the source of the alarm event and preferably to the safe location, and generating an additional output signal to activate specific loudspeakers or transmit a data carrying signal to a specific mobile communication device to issue an additional protection warning signal if any one or more people do not move away from the source of the alarm event or to the safe location at all or fast enough to avoid the source of the alarm event.

There is still further provided for the method to include the step of the processor:

generating an output signal that is transmitted to a loudspeaker within a predeterminable distance from the location of a specific authorized person, with the output signal being configured to activate the loudspeaker to issue and audio message with the person's name and with movement instructions for a route to follow to evacuate the property, move away from source of the alarm event or reach the sale location, as the case may be.

There is also provided for the method to include the step of the processor:

monitoring the distance between an intruder being the source of an alarm event and authorized people on the property, and generating an output signal that activates one or more specific countermeasure devices to deter the intruder from moving closer to the authorized people, with the specific countermeasure devices including, without limitation, an automated pepper spraying device and a restraining device, each being remotely controllable by means of output signals generated by the processor.

These and other features of the invention are described in more detail below.

DESCRIPTION OF THE INVENTION

A security system according to the invention includes a controller with an associated processor, associated storage means, power supply, and data communication means.

The system is system configured to include at least one associated event sensor and at least one countermeasure device, each in data communication with the controller through the data input and output means.

In a typical application, several event sensors will be installed and in communication with the controller. The event sensors can include passive infrared motion sensors, magnetic contact sensors, electric fence voltage monitors, vibration sensors, sound sensors, smoke detectors, radar detection, laser pulse detection and cameras with infrared or thermal lighting capability coupled with for example motions sensors. Each of these will perform its own dedicated function and connects to the controller by means of a data communication connection suitable for the specific type of event sensor. This may include a hard wire data communication cable or a wireless data communication connection through a wireless communication protocol.

Also connected to the data communication means of the controller is a number of countermeasure devices. These may include for example sound, light or incapacitating gas release modules or a restraining device such as, for example, the commercially available BolaWrap®. A bola is a nonlethal weapon consisting of two or more heavy balls secured to the ends of one or more strong cords, hurled by the indigenous inhabitants of southern South America to entangle the legs of cattle and other animals. A BolaWrap® is a hand-held remote restraint device that discharges a bola style Kevlar® tether, with a length of about 2.4 m, to wrap around a person's legs or arms at an effective range of about 3 m to 7.5 m.

The countermeasure devices may also include physical intervention by a human response unit. This may be used in addition to other more directly and more instantaneously applied countermeasure devices (such as sound, light or incapacitating gas release modules or a BolaWrap®), or as the only countermeasure device. The choice of countermeasure device is typically dictated by the specific requirements in respect of the protected asset and local legislation. In the instance of a human response unit, there may also be incorporated a human verification aspect, with a monitoring station (such as a security control room) confirming the presence of the alarm event and dispatching the response team. The monitoring station can also be alerted to remotely activate a countermeasure device. The monitoring station may also comprise a software application on a user's mobile communication device, with the user being enabled to activate a countermeasure device remotely.

The controller is configured to continuously receive data input from the event sensors, and it also analyses this data continuously. It has stored, on its storage means, rules and parameters associated with each event sensor, according to the type of device and the specific device itself. The rules to the type of device may for example be rules for cameras, and the parameter for a specific camera may for example be that there should not be any motion or people in the field of view of the camera during specific hours of the day.

The event sensors and countermeasure devices are selected, and their parameters are set up, to complement a specific installation.

The setup may be such that the controller is enabled to determine an alarm event based on the occurrence of event within the parameters specified for that event sensor type. In addition, the controller may be configured to store data relating to people that are associated with the specific installation, and thus being authorized people. For example, with a household installation the controller may be programmed with facial imaging data of the people forming part of the household, i.e. family members and staff. These could be categorized according to their position, i.e. family members and staff.

This enables the controller by means of data from cameras to identify the authorized people. In the case of family members there is typically no time parameter associated with them, meaning they are allowed on the associated property at all times.

Staff members will usually have date and time parameters associated with them. For example, a staff member that has working hours of 8am to 4pm on weekdays is allowed on the property during those hours, with some leeway either side thereof as may be determined by the homeowner. Such a staff member is not allowed on the property outside those hours, on weekends or on public holidays or when the staff member is on leave.

The controller applies facial recognition to all the data/images it receives from its cameras, to compare it with its stored facial imaging data. If the controller detects a person on the property outside parameters allowed for that person, it implements an associated output stored on the storage means for such an event.

The programmed output can vary depending on the type of event, and parameters related to it. This may vary from entering a note in a log, transmitting a notification to a connected device, or triggering a specific countermeasure device to deploy at the correct time. Along with triggering one or more countermeasure devices, an alarm signal will typically also be transmitted to a conventional alarm signal monitoring company. They will then be able to dispatch a response team to the property to apprehend the intruder.

The system also transmit data to a software application that is operable on a mobile communication device, such as smartphone, tablet, laptop, or computer. This allows a person, for example a homeowner, to receive sensible notifications of what is happening at his home, whether he is away or actually at home.

In an example case, the countermeasure device may comprise an oleoresin capsicum spray container concealed in a housing that masks the oleoresin capsicum spray container as light fitting. Once the controller has determined that a person should not be on the property and should be deterred from progressing further into it, the controller monitors the person's progress by means of all available event sensors, including motion sensors, cameras, sound monitoring, and so forth. When the controller determines that the person is within range of a specific countermeasure device, for example a hidden oleoresin capsicum spray container, it triggers the oleoresin capsicum spray container to spray the person. The normal effect of this is to incapacitate the person, deter his current activities and hopefully motivate the person to leave the property.

The controller monitors the area under its surveillance and effectively plots the movement of the person on the property. If the person is moving in a specific direction in view of a camera and, for example through a passage, the controller will proactively monitor the feed from a further camera to continue tracking the person. Ideally cameras will overlap in coverage to enable the controller to continuously keep the person in view. This coverage is complimented by data from motion and sound sensors, and the like.

The controller may be configured that if it determines a person that is allowed in the property (i.e. is an authorized or allowed person) is in close proximity of an intruder, the controller won't trigger a countermeasure device to avoid applying the countermeasure also to the allowed person. Alternatively, the controller may issue a warning signal to the allowed person before it deploys the countermeasure device. The warning signal may, for example, be a number of audible beeps, the number of which will be known the allowed person. That person will then know that when the defined number of beeps has finished the countermeasure device will be deployed. This will give the allowed person time to move out of range of the countermeasure device.

The countermeasure device may also include fog, lights, sirens and other acoustic type deterrents. Any suitable and lawful sensory and physical deterrent may be deployed as a countermeasure device.

The countermeasure devices would not be limited to indoor application only. In a more ideal configuration, the controller will monitor both the outside and inside of a monitored property. With a household, the deployment of countermeasure devices ideally will already be used outside the house. This will, for example, allow the system to detect an intruder once an event sensor such as an electric fence or motion detection beam has been triggered. This can also be by means of cameras located outside a house, and even observing outside the perimeter of the property. Such outside cameras can detect and track movement of the intruder. The property may have a plurality of oleoresin capsicum spray modules mounted inconspicuously throughout the property. When the controller determines that the intruder is in range of one of these, its oleoresin capsicum spray may be triggered to spray the intruder. By then, an alarm signal would already have been sent to a conventional alarm signal monitoring company to send a response team to the property.

To avoid members of the response team from being targeted by the controller, the alarm signal monitoring company can confirm that a response team has been dispatched and confirm when they actually arrive on site. This is done through data communication between the control room of the alarm signal monitoring company and the controller. The controller is then effectively on the lookout for a response team, and it will be able to identify them with a street facing camera when they arrive on the scene and track their movement. They will then effectively be tagged as "allowed persons" for the duration of the incident which will stop the controller from deploying countermeasures against them.

Once the situation has been resolved and the security system has been reset, those same response team members won't again be able to enter the property without eliciting the deployment of countermeasure device, unless there is a new alarm signal transmitted by the controller to the alarm signal monitoring company and its control room dispatches the response team to the property again.

As mentioned, it is possible to incorporate other countermeasure devices depending on the applicable laws and degree of security that is desired. Where lawful, it is possible to install a cartridge-powered or compressed gas-powered pepper ball gun incorporated into an automatic gun turret. This pepper ball gun could fire one or more pepper balls to an intruder once he has been identified as such by the controller.

The aim of the deployment of the countermeasure devices is to drive an intruder away from a monitored property. If this is successful, the people on the property (i.e. the lawful occupiers) are kept safe. If the intruder is only slowed down and not deterred, then the secondary aim is to provide additional time for people on the property to reach safety, for example a safe room. This could be enough time for them to barricade themselves against such intruders. In the interim, a response team would have been alerted and would be on route to assist the people on the property.

In a further enhancement of the implementation of the security system, the controller could be programmed to know how many people are allowed on a property at any given time and who they are, with the latter detail being confirmed by means of facial recognition. When an alarm is sound the people will know to move to a specific safe room, for example a main bedroom.

The controller will know where each person is in the property and can give each person, by name, a specific command to move to the safe room. This won't be a general audio announcement throughout a house. Instead, for example the camera nearest each person which has that person in view can give that person-specific command to such a person, using a built-in speaker in the camera.

The controller can then also monitor that all family members (allowed people) are responding and moving to the safe room. Such a property may also, for example, have a motorized security barrier installed in a passage leading to the safe room. Once the last family member has passed by the barrier the controller can activate the barrier to close behind that person. This is done whilst, for example, an intruder is being sprayed with pepper spray or shot with pepper balls in the garden, and before the intruder even reaches an entry point into the property.

The use of person-specific announcements or commands can be decided by a determination of the system about the amount of available time and whether some family members are, for example, in the same area. If there is not enough available time to mention people by name or multiple people are in the same area and mentioning specific names may be confusing, then a more generic command may be given. The system is intelligent and flexible to adapt its monitoring and interaction with people to suit the prevailing circumstances.

From within the safe room the family will be able to monitor the current activity so that they can visually confirm the status. This will allow them to take control when they deem it safe, for example to deactivate the alarm.

As mentioned above, one of the countermeasure devices include an irritant agent dispenser, most typically a oleoresin capsicum spray module. This comprises a housing which contains pressurized irritant agent, in this embodiment oleoresin capsicum spray in a pressurized cannister. The detail of such a dispenser forms the subject of a co-pending PCT patent application submitted coterminous with this present application.

In another example embodiment, the event sensors may include smoke detectors and upon detecting smoke the controller can determine the location of the origin of the fire. This allows the controller to trigger countermeasure devices in the form of fire extinguishing agent over the affected area, and also to notify people on the property to vacate the property. The controller can also notify emergency services to respond to the fire, whilst it is already deploying the countermeasures to at least partly contain it.

In another example embodiment, the event sensors may include biometric sensors worn by family members, for example smart watches that incorporate biometric health sensors such as heart rate, ECG and blood oxygen monitors, and which may also include software that determine when a person has fallen. The controller may then be configured to alert other family members and emergency services if a family member suffers a medical emergency. It could then also be enabled to monitor for the arrival of such assistance, unlock doors when the emergency personnel or family members arrive and guide them by means of audio cues to the position where the specific person is located. In such an instance, the controller would be on the lookout for the arrival of the emergency services and would be able to confirm their arrival by means of street facing cameras. It would be programmed to recognize the appearance and sound of emergency vehicles by comparing imaging and audio data of a range of typical emergency vehicles with the vehicles that actually arrives on the scene.

The controller is located on the monitored property. The data analysis is done onsite by the processor which means there is no outside or third-party access to data from the event sensors, especially from cameras. This overcomes any privacy issues and data connectivity issues. This also allows cameras to be installed in areas that it would otherwise be ill-advised to do.

Communication from the event sensors to the controller is local and very fast. Communication to the countermeasure devices are similarly local and very fast. This can be changed if the owner wishes to. The system can allow an alarm monitoring company to intervene if the owner didn't set an auto reaction or if the owner is incapable of acting.

The system can be powered by a conventional power supply with a conventional backup supply to keep the entire system active even during prolonged power outages. For further reliability the system may be connected to alternative power supply such as batteries recharged by solar panels. This effectively takes the system off-grid and 100% available.

The localized location of the controller effectively provides a self-contained and self-sufficient security system. Using the system allows a user to take control of his own security, and to not be completely reliant on outside help. Although the person may still elect to use outside assistance from a conventional security company, the system allows the person and his family to move to safety whilst the intruder is being deterred or at least being delayed. In vulnerable and remote areas, such as farms, where help may take a long time to arrive, the advantage that the system provides to its users is significant and may mean the difference between life and death during violent home invasions.

The system uses algorithms that allow it to improve the accuracy of its interactions. The system administrators are also able to enable these improvements to reach each installation of the security system by means of software updates, which continuously improves the performance of the system without exposing any user data.

It will be appreciated that the embodiment described above is given by way of example only and is not intended to limit the scope of the invention. It is possible to alter aspects of the embodiment without departing from the essence of the invention.

It is for example possible to provide a cloud-based processor for the system, instead of the above mentioned locally-based processor. This is expected to have a cost benefit and will include stringent security features that address privacy concerns of users.

It is also envisaged that the system described above may be used in conjunction with insurance providers. Use of the system provides users with a unique advantage in combatting crime, which is expected to result in lower risk to insure a property at which the system is installed. The system may also be configured to issue compliance reports to an insurer to enable it to confirm that the system is active and operational. Since an insurer has a vested interest in ensuring that a property is not subjected to crime it can function as a third-party overseer to alert a property owner in case a fault is reported by the system. This could allow an insurer to, for example, contact a homeowner to notify it that an electric fence is broken.

It is also possible, where the insurer will be responsible for the cost of such repairs to initiate the repairs from its side, possibly even before the homeowner is aware thereof. This could be the case where, for example, an electric fence is knocked-out during the night by lighting during a storm and the insurer immediately receives a fault report in respect of the property. With the cause of the problem identified by the system, the insurer (likely in the form of an intelligent automated system operating on behalf of the insurer) can initiate an inspection of the site and repairs before the homeowner is even aware of the problem.

It will also be appreciated that although the example embodiment described above relates mainly to residential applications, the system is equally applicable to other settings. These could include business applications, where similar concerns as with residential security exist, including privacy and reaction time. The system is also applicable to higher security applications such as in banks, police stations, prisons, borders, VIP protection and the like.

By way of example, the system may be used to assist in safeguarding a prison to monitor restricted areas. Guards may be provided with tracking devices that along with facial recognition monitor their position. This allows the system to determine whether a person that is in a restricted area is allowed there, for example the person is a guard on patrol; or not, for example the person is a prisoner trying to escape. If a person moves into a restricted area the guards may be alerted while the person or persons are targeted with suitable countermeasure devices, such as a pepper spray, BolaWrap®, etc, to contain them.

The system is thus applicable in any setting where people and events need to be monitored to maintain a status quo.

The invention claimed is:

1. A security system which includes a controller with an associated processor, associated storage means, a power supply, and data communication means;
   with the system configured to include at least one associated event sensor and at least one associated countermeasure device, both operatively associated with an asset monitored by the security system and in data communication with the controller through the data communication means;
   with the processor configured:
   to receive data input from an associated event sensor, and
   to analyse data input from the event sensor according to predeterminable rules and parameters in respect of the event sensor stored on the storage means for the processor to determine the presence of an alarm event;
   for the processor to determine from the alarm event and from a predetermined set of responses and predetermined set of security outcomes stored on the storage means in association with the alarm event a selected response to the alarm event with the aim of achieving a predetermined security outcome to protect the asset, and
   for the processor to generate an output signal to:
   at least one countermeasure device with the output signal configured to activate the countermeasure device to deliver the selected response, or
   at least one monitoring station with the output signal configured to alert the monitoring station to activate the countermeasure device to deliver the selected response.

2. The security system as claimed in claim 1 in which the event sensors include any one or more of passive infrared motion sensors, magnetic contact sensors, electric fence voltage monitors, vibration sensors, sound sensors, smoke detectors, radar detectors, laser pulse detectors, and cameras preferably with integrated infrared lighting or thermal imaging capability, and any other suitable event sensor configured to detect the occurrence of a specific event relevant to monitoring of the asset by the security system.

3. The security system as claimed in claim 1 which is configured for the processor to generate an output signal to activate a specific countermeasure device at a specific time to deliver the selected response based on input received from event sensors operatively associated with the specific countermeasure device, with the specific time being determined by the processor to optimize the effectiveness of activation of the countermeasure device in achieving the predetermined security outcome to protect the asset.

4. The security system as claimed in claim 3 which is configured for the processor to monitor data input from the event sensors operatively associated with the specific countermeasure device to determine whether the activation of the specific countermeasure device has achieved the predetermined security outcome within a predeterminable time, and if the desired security outcome has not been achieved within such time for the processor to generate an output signal to activate the same countermeasure device again or to activate another countermeasure device to deliver the selected response, alternatively for the processor to determine a modified response and for the processor to generate an output signal to activate the same countermeasure device again or to activate another countermeasure device to deliver the modified response, to achieve the predetermined security outcome.

5. The security system as claimed in claim 1 which includes, stored on the storage means, a database with data relating to authorised people, being people associated with the asset, with the database including without limitation imaging data related to the authorised people, and schedule data indicating whether there is any time when an authorised person is not allowed on a property associated with the asset or at a specific location on the property;
with the system configured for the processor:
to monitor by means of event sensors the presence and location of people on or proximate the property;
for the processor to determine as an alarm event any one of the following:
the presence on the property of an unauthorised person, being a person that is not associated with the asset;
the presence of an unauthorised person loitering proximate the property, with loitering determined by a person remaining in a predeterminable geographical area longer than a predeterminable period;
the presence of an authorised person on the property at a time when the person is not allowed on the property; and
the presence of an authorised person in a location on the property where the person is not allowed;
for the processor to determine a selected response to the alarm event; and
for the processor to generate an output signal to activate a specific countermeasure device directed at the person whose presence or location on or proximate the property causes the determination of the alarm event.

6. The security system as claimed in claim 5 in which the selected response to the alarm event caused by the presence of an authorised person in a location on the property where the person is not allowed includes at first a warning signal, with the warning signal comprising an audio message directing the person to move out of the location where the person is not allowed.

7. The security system as claimed in claim 5 which is configured to differentiate at least between:
a fire alarm determined from data input received by the processor from a smoke detector, including from a camera configured to detect smoke, and
a security alarm determined from data input received by the processor from any one or more of one of the event sensors excluding the smoke detector.

8. The security system as claimed in claim 7 in which the processor is configured to generate an output signal that activates any one or more of a loudspeaker or the transmission of a data carrying signal to a mobile communication device to:
issue an evacuation warning signal to authorised people in the event that it determines an alarm event to be a fire alarm, and
issue a protection warning signal if it determines an alarm event to be a security alarm.

9. The security system as claimed in claim 8 in which the predetermined security outcome associated with the evacuation warning signal includes the evacuation from the property of authorised people who are present on the property;
the system is configured for the processor to monitor the movement and location at least of authorised people who are present on the property at the time of the alarm event by means of data input from event sensors to confirm their evacuation from the property, and
the system is configured for the processor to generate an additional output signal to activate specific loudspeakers or transmit a data carrying signal to a specific mobile communication device to issue evacuation warning signals to authorised people who need to evacuate the property.

10. The security system as claimed in claim 8 in which the predetermined security outcome associated with the protection warning signal is the movement of authorised people away from a source of the alarm event, preferably to at least one predeterminable safe location on the property;
the system is configured for the processor to monitor the movement and location at least of authorised people who are present on the property at the time of the alarm event, and to monitor the location and movement of the source of the alarm event by means of data input from event sensors to confirm the movement of authorised people away from the source of the alarm event and preferably to the safe location, and
the processor is configured to generate an additional output signal to activate specific loudspeakers or transmit a data carrying signal to a specific mobile communication device to issue an additional protection warning signal and movement guidance if any one or more people do not move away from the source of the alarm event or to the safe location at all or fast enough to avoid the source of the alarm event.

11. The security system as claimed in claim 8 in which the loudspeaker is associated with a camera, and the system is configured for the processor to generate an output signal that is transmitted to a loudspeaker within a predeterminable distance from the location of a specific authorised person, and the output signal is configured to activate the loudspeaker to issue and audio message with the person's name and with movement instructions for a route to follow to evacuate the property, move away from source of the alarm event or reach the sale location, as the case may be.

12. The security system as claimed in claim 10 which is configured for the processor to monitor the distance between an intruder being the source of an alarm event and authorised people on the property, and for the processor to generate an output signal that activates one or more specific countermeasure devices to deter the intruder from moving closer to the authorised people, and the specific countermeasure devices include, without limitation, an automated pepper spraying device and a restraining device, each being remotely controllable by means of output signals generated by the processor.

13. The security system as claimed in claim 1 in which the asset comprises any one or more of a person, a place or an object.

14. A method of operating a security system as claimed in claim 1, which includes the steps of the processor:
receiving data input from an associated event sensor,
analysing data input from the event sensor according to predeterminable rules and parameters stored on the storage means for the processor to determine the presence of an alarm event,
determining from the alarm event and from a predetermined set of responses and predetermined set of security outcomes stored on the storage means in association with the alarm event a selected response to the alarm event with the aim of achieving a predetermined security outcome to protect the asset, and
generating an output signal to:
at least one countermeasure device with the output signal configured to activate the countermeasure device to deliver the selected response, or
at least one monitoring station with the output signal configured to alert the monitoring station to activate the countermeasure device to deliver the selected response.

15. The security as claimed in claim 14 which includes the step of the processor:
generating an output signal to activate a specific countermeasure device at a specific time to deliver the selected response based on input received from specific event sensors operatively associated with the specific countermeasure device, with the specific time being determined by the processor to optimize the effectiveness of activation of the countermeasure device in achieving the predetermined security outcome to protect the asset.

16. The security as claimed in claim 14 which includes the steps of the processor:
monitoring data input from the event sensors operatively associated with the specific countermeasure device to determine whether the activation of the specific countermeasure device has achieved the predetermined security outcome within a predeterminable time, and
if the predetermined security outcome has not been achieved within such time the step of the processor:
generating an output signal to activate the same countermeasure device again or to activate another countermeasure device to deliver the selected response;
alternatively, the steps of:
determining a modified response, and
generating an output signal to activate the same countermeasure device again or to activate another countermeasure device to deliver the modified response, to achieve the predetermined security outcome.

17. The method as claimed in claims 14 which includes the steps of the processor:
monitoring by means of event sensors the presence and location of people on or proximate the property;
determining as an alarm event any one of the following:
the presence on the property of an unauthorised person, being a person that is not associated with the asset;
the presence of an unauthorised person loitering proximate the property, with loitering determined by a person remaining in a predeterminable geographical area longer than a predeterminable period;
the presence of an authorised person on the property at a time when the person is not allowed on the property; and
the presence of an authorised person in a location on the property where the person is not allowed;
determining a selected response to the alarm event; and
generating an output signal to activate a specific countermeasure device directed at the person whose presence or location on or proximate the property causes the determination of the alarm event.

18. The method as claimed in claim 14 which includes the step of the processor:
differentiating between types of alarm events, including at least:
a fire alarm determined from data input received by the processor from a smoke detector, including from a camera configured to detect smoke, and
a security alarm determined from data input received by the processor from any one or more of one of the event sensors excluding the smoke detector.

19. The method as claimed in claim 18 which includes the step of the processor generating an output signal that activates any one or more of a loudspeaker or the transmission of a data carrying signal to a mobile communication device to issue an evacuation warning signal to authorised people in the event that it determines an alarm event to be a fire alarm, and to issue a protection warning signal if it determines an alarm event to be a security alarm.

20. The method as claimed in claim 19 which includes the steps of the processor:
monitoring the movement and location of at least authorised people who are present on the property at the time of the alarm event by means of data input from event sensors to confirm their evacuation from the property, and
generating an additional output signal to activate specific loudspeakers or transmit a data carrying signal to a specific mobile communication device to issue evacuation warning signals to authorised people who need to evacuate the property.

21. The method as claimed in claim 19 which includes the steps of the processor:
monitoring the movement and location of the authorised people who are present on the property at the time of the alarm event,
monitoring the location and movement of the source of the alarm event by means of data input from event sensors to confirm the movement of people associated with the property away from the source of the alarm event and preferably to the safe location, and
generating an additional output signal to activate specific loudspeakers or transmit a data carrying signal to a specific mobile communication device to issue an additional protection warning signal if any one or more people do not move away from the source of the alarm event or to the safe location at all or fast enough to avoid the source of the alarm event.

22. The method as claimed in claim 21 which includes the step of the processor:
generating an output signal that is transmitted to a loudspeaker within a predeterminable distance from the location of a specific authorised person, with the output signal being configured to activate the loudspeaker to issue and audio message with the person's name and with movement instructions for a route to follow to evacuate the property, move away from source of the alarm event or reach the sale location, as the case may be.

23. The method as claimed in claim 21 which includes the steps of the processor:

monitoring the distance between an intruder being the source of an alarm event and authorised people on the property, and generating an output signal that activates one or more specific countermeasure devices to deter the intruder from moving closer to the authorised people, with the specific countermeasure devices including, without limitation, an automated pepper spraying device and a restraining device, each being remotely controllable by means of output signals generated by the processor.

* * * * *